United States Patent
Shah (10) Patent No.: US 8,873,430 B1
(45) Date of Patent: *Oct. 28, 2014

(54) SYSTEM AND METHODS FOR PRESENTING STORAGE

(71) Applicant: QLogic, Corporation, Aliso Viejo, CA (US)

(72) Inventor: Shishir Shah, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/770,828

(22) Filed: Feb. 19, 2013

Related U.S. Application Data (63) Continuation of application No. 12/730,139, filed on Mar. 23, 2010, now Pat. No. 8,406,152.

(51) Int. Cl.
*G06F 13/00* (2006.01)
*G06F 3/06* (2006.01)

(52) U.S. Cl.
CPC .................................. *G06F 3/0689* (2013.01)
USPC ........... 370/254; 370/412; 370/419; 711/114; 711/118

(58) Field of Classification Search
CPC .......................... G06F 9/26–9/34; G06F 13/34
USPC ............ 370/412–419, 428–429; 710/74, 105, 710/316; 711/103, 112–118, 162–163, 135, 711/154, 202, 207
See application file for complete search history.

(56) References Cited

U.S. PATENT DOCUMENTS

| | | |
|---|---|---|
| 7,002,976 B2 | 2/2006 | Dupont |
| 7,697,554 B1 | 4/2010 | Ofer et al. |
| 7,933,993 B1 | 4/2011 | Skinner |
| 8,406,152 B1 * | 3/2013 | Shah ............................. 370/254 |
| 2003/0236945 A1 * | 12/2003 | Nahum ......................... 711/114 |
| 2006/0206603 A1 | 9/2006 | Rajan et al. |
| 2007/0283186 A1 | 12/2007 | Madnani et al. |
| 2008/0008202 A1 | 1/2008 | Terrell et al. |
| 2009/0083445 A1 | 3/2009 | Gango |
| 2009/0157846 A1 | 6/2009 | Shimozono et al. |
| 2009/0177813 A1 | 7/2009 | Barrett et al. |
| 2010/0169467 A1 | 7/2010 | Shukla et al. |
| 2010/0232450 A1 | 9/2010 | Maveli et al. |
| 2011/0022812 A1 | 1/2011 | van der Linden et al. |
| 2011/0078334 A1 | 3/2011 | Arakawa et al. |
| 2012/0060010 A1 | 3/2012 | Shimozono et al. |

OTHER PUBLICATIONS

"Office Action from USPTO dated Feb. 16, 2012 for U.S. Appl. No. 12/730,139".

(Continued)

*Primary Examiner* — Charles C Jiang
*Assistant Examiner* — Mohamed Kamara
(74) *Attorney, Agent, or Firm* — Klein, O'Neill & Singh, LLP (57) ABSTRACT

A machine implemented method is provided. The method comprises configuring a target port of a target storage array as a plurality of virtual ports; wherein an application executed by a computing system uses the target port to access storage space at the storage array; presenting the plurality of virtual ports to an operating system instance executed by a computing system processor; and using the plurality of virtual ports to read and write information to the storage space of the target storage array.

17 Claims, 6 Drawing Sheets

(56) References Cited

OTHER PUBLICATIONS

"Final Office Action from USPTO dated May 23, 2012 for U.S. Appl. No. 12/730,139".

"Office Action from USPTO dated Oct. 3, 2012 for U.S. Appl. No. 12/730,139".

"Notice of Allowance from USPTO dated Feb. 1, 2013 for U.S. Appl. No. 12/730,139".

* cited by examiner

SYSTEM AND METHODS FOR PRESENTING STORAGE

CROSS-REFERENCE TO RELATED APPLICATION

This application is a continuation of application Ser. No. 12/730,139, filed on Mar. 23, 2010, now U.S. Pat. No. 8,406,152, the entire contents of which are hereby incorporated by reference.

The present invention relates to network and storage systems.

RELATED ART

Host systems commonly use a storage array to store information. The storage array is typically managed by a target controller that interfaces with a storage server. The storage server receives user requests for reading and writing information. The storage server interfaces with the target controller to respond to user requests.

The storage array is typically configured to have a plurality of logical unit numbers (LUNs). Typically, the LUNs are presented to a host system by the target controller. The host system uses the LUNs to read and write information to the physical storage devices.

Conventional operating systems running in the Host system today have shortcomings in supporting larger number of LUNs per target controller. For example, typically an operating system running on a host computing system today limits the number of LUNs to 256 per target controller. Limiting the number of available LUNs may not be desirable particularly when a single physical host computing system can support various virtual machines (or virtual hosts) in a virtual machine environment. Continuous efforts are being made to present more LUNs to a host system so that a host system is able to use more storage space to read and write data.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages, which includes presenting storage to a plurality of virtual machines.

In one embodiment, a machine implemented method is provided. The method comprises: configuring a target port of a target storage array as a plurality of virtual ports; wherein an application executed by a computing system uses the target port to access storage space at the storage array; presenting the plurality of virtual ports to an operating system instance executed by a computing system processor; and using the plurality of virtual ports to read and write information to the storage space of the target storage array.

In another embodiment a system is provided. The system comprises: a computing system having a processor for executing an operating system instance in a virtual environment; and a router operationally coupled to the computing system and a target storage array having a plurality of target ports interfacing with a plurality of router ports; wherein the router presents a target port as a plurality of virtual ports to the operating system instance for accessing the storage array; and wherein the router presents a router port to the target storage array as a plurality of virtual ports such that a target port is presented with more than one image of the computing system making the target port believe it is communicating with more than one computing system.

In yet another embodiment, a router is provided. The router comprises a plurality of front-end ports operationally coupled to a computing system having a processor for executing a plurality of virtual machines; a plurality of back-end ports coupled to a target storage array having a plurality of target ports used for reading and writing information to a storage device; and a processor executing instructions out of a router memory for presenting a target port as a plurality of virtual ports to a virtual machine for accessing the storage device; and presenting a back end router port to a target port as a plurality of virtual ports such that the target port is presented with more than one image of a virtual machine and making the target port believe it is communicating with more than one virtual machine.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or may correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Figure 1A:
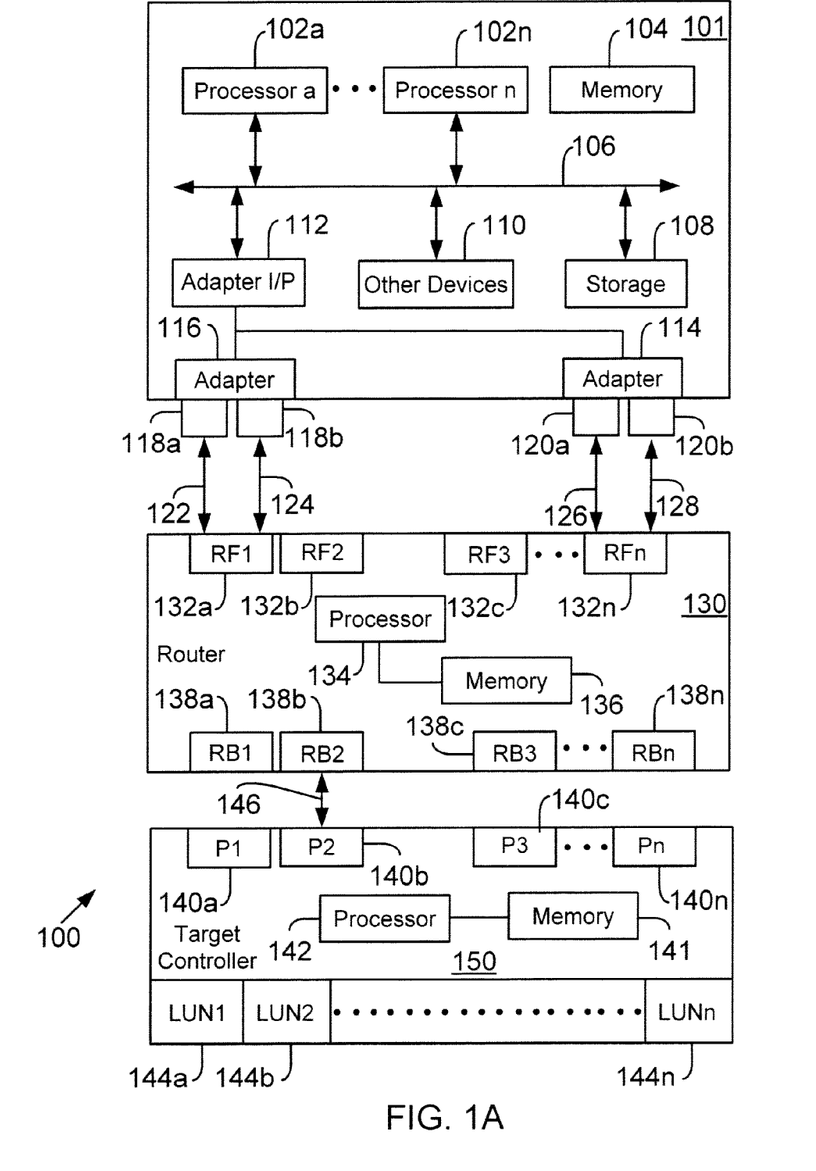
FIG. 1A is a block diagram of a system used according to one embodiment.

Network/Storage System:

FIG. 1A is a block diagram of a system 100 including a computing system 101 (may also be referred to as "host system 101") coupled to one or more adapters 114 and 116 that interface with a storage system (also referred to as target, target controller or target storage array) 150 via a router 130. There may be other systems/components that may be placed between the aforementioned components but they are not germane to the embodiments disclosed herein.

The host system 101 may include one or more processors 102a-102n (jointly referred to as processor 102), also known as a central processing unit (CPU), interfacing with other components via a computer bus 106. The computer bus 106 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

The host system 101 may include a storage device 108, which may be for example a hard disk, a CD-ROM, a non-volatile memory device (flash or memory stick) or any other device. Storage 108 may store processor executable instructions and data, for example, operating system program files, application program files, and other files. Some of these files are stored on storage 108 using an installation program. For example, the processor 102 may execute computer-executable process steps of an installation program so that the processor 102 can properly execute the application program.

Host system 101 interfaces with memory 104 that may include random access main memory (RAM), and/or read only memory (ROM). When executing stored computer-executable process steps from storage 108, the processor 102 may store and execute the process steps out of memory 104. ROM may store invariant instruction sequences, such as start-up instruction sequences or basic input/output operating system (BIOS) sequences for operation of a keyboard (not shown).

The host system 101 may also include other devices and interfaces 110, which may include a display device interface, a keyboard interface, a pointing device interface and others.

Host system 101 may also include an adapter interface 112 that allows the host system to interface with adapters 114 and 116, as described below. The links between adapters 114/116 and adapter interface 112 may be a peripheral bus, for example, a PCI, PCI-X or PCI-Express link. The adapters may be configured to handle both network and storage traffic using various network and storage protocols to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapters 114 and 116 shown in FIGS. 1A and 1B may be configured to operate as a FCOE adapter and may be referred to as FCOE adapters 114/116. QLogic Corporation, the assignee of the present application, provides one such adapter. Those of ordinary skill in the art will appreciate, however, that the present embodiments are not limited to any particular protocol. The illustrated FCOE adapters 114/116 are merely one example of a converged network adapter that may leverage the advantages of the present embodiments.

Another common protocol that may be used by adapter 114/116 is the iSCSI protocol. The iSCSI standard is based on Small Computer Systems Interface ("SCSI") which enables host computer systems to perform block data input/output ("I/O") operations with a variety of peripheral devices including disk and tape devices, optical storage devices, as well as printers and scanners. A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

Adapters 114 and 116 may include a plurality of ports 118a/118b and 120a and 120b to communicate with other devices for example, router 130 and target controller 150 (also referred to as target 150). The adapter ports include logic and hardware to handle both network and storage traffic. The host system 101 communicates with router 130 and target controller 150 through the ports.

Router 130 may include a plurality of front end ports (RF1-RFn) 132A-132n that interface with the adapter 114/116 ports. Router 130 may include a processor 134 that executes programmable instructions (for example, firmware) out of memory 136 to control router 130 operations.

Router 130 may also include a plurality of back end ports (RB1-RBn) 138a-138n that interface with target ports (P1-Pn) 140a-140d. Target 150 may also include a processor 142 that executes programmable instructions out of memory 141.

Target 150 presents a physical representation of storage as a logical structure, called a logical unit number (LUN). Each LUN has a unique identifier and unique attributes. A host system processor that wants to read or write data accesses the presented LUN. FIG. 1A shows a plurality of LUNs 144a-144n that are presented to host system 101.

Conventional systems have drawbacks with respect to presenting LUNs to a host system. In a typical system, only a certain number of LUNs can be presented to an initiator (i.e. a host system with an adapter). Commonly used configurations limit the number of LUNs to 256 LUNs per target port. One option for increasing the number of LUNs presented per initiator is to virtualize the LUNs. However, this adds complexity to managing the storage system because virtualizing the LUNs may affect other operations, for example, backup and disaster recovery operations provided by target 150.

Figure 3A:
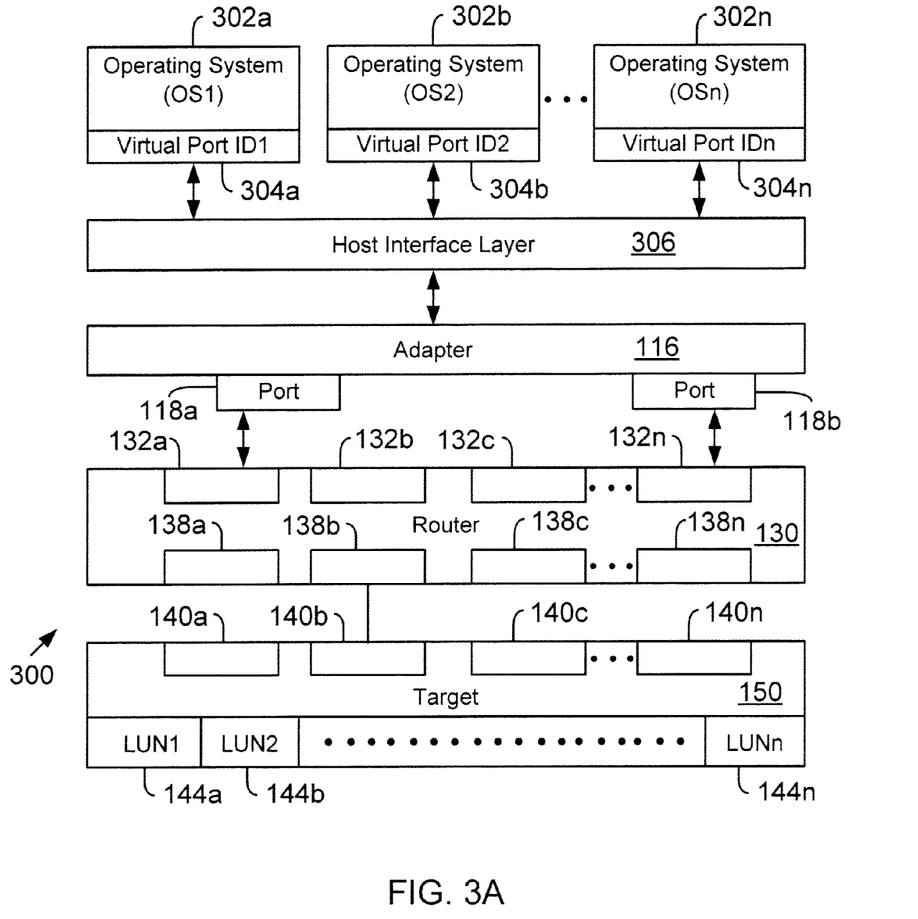
FIG. 3A shows a block diagram of a system using multiple operating system images, according to one embodiment.

The embodiments disclosed herein provide a solution that does not need or use LUN virtualization, for example, for a host interface layer 306 as shown in FIG. 3A and described below in detail. In one embodiment, a router presents a host system as a "virtual group" and presents a storage array as multiple "storage arrays" without virtualizing the actual storage LUNs. The router based virtualization is described below in detail.

Figure 1B:
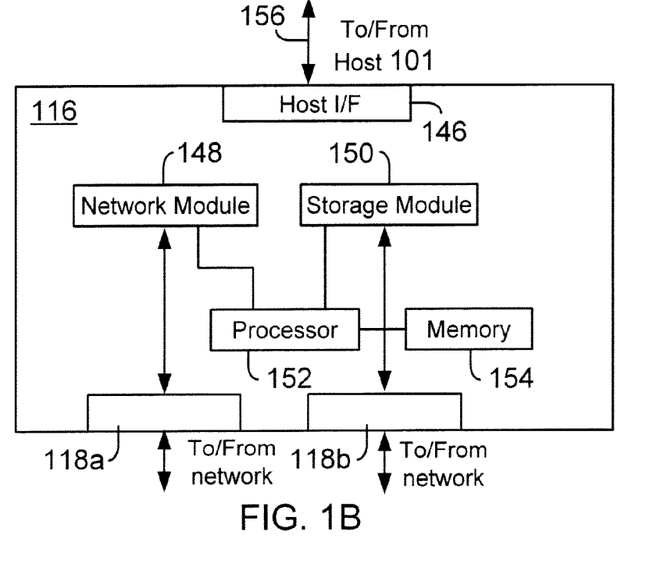
FIG. 1B shows a block diagram of an adapter, used according to one embodiment.

Adapter 116:

Before describing router based virtualization, the following describes adapter 116/114. FIG. 1B shows an example, of adapter 116 (or 114) used for sending and receiving information to and from host 101. Adapter 116 may include a host interface 146, network module 148, storage module 150, adapter processor 152 and memory 154. The host interface 146 is configured to interface with host system 101, via bus 156. As an example, bus 156 may be a PCI, PCI-X, PCI-Express or any other type of interconnect.

Memory 154 may be used to store programmable instructions, for example, firmware. The adapter processor 152 executes firmware stored in the memory 154 to control overall functionality of adapter 116 and also interface with host 101 and other devices.

Figure 2:
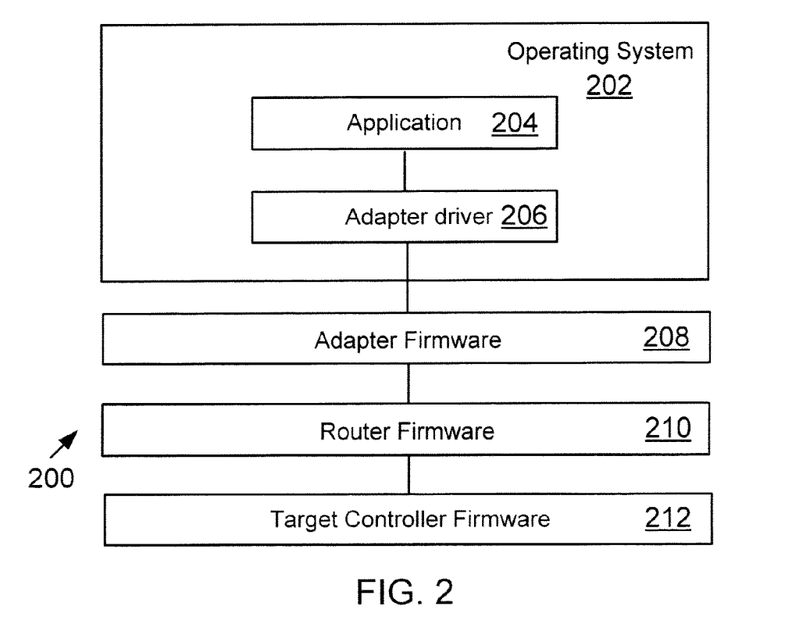
FIG. 2 shows a block diagram of an architecture used by the system of FIG. 1A.

Architecture:

FIG. 2 shows a block diagram of a system 200 that may be used to access LUNs in system 100. System 200 includes an operating system (for example, a Windows based Operating System, a Linux based system and others) 202 that is executed by host system 101. Application 204 is executed by host system 101 using programmable instructions out of memory. Application 204 may be used to send user requests to access storage, i.e. for reading and writing information. To process input/out requests from the host 101, adapter driver 206 interfaces with adapter firmware 208.

Router firmware 210 is executed by router processor 134 to control router 130 operations and target controller firmware 212 is executed by target controller processor 142 to control the target controller 150 operations.

Virtual Environment:

FIG. 3A shows an example of a virtual environment 300 that may be used to access storage system. System 300 may include a plurality of operating systems (OS1, OS2, ... OSN) 302a-302n (also referred to as OS) that are executed by host 101. The operating systems in this case may be of different types. For example, OS1 302a may be a Windows based system, OS2 302b may be a Linux based operating system, OS3 302n may be a Solaris based operating system and so on. The different operating systems are images that are executed in a virtual machine environment. One such environment/product is provided by VMWare Inc. and Microsoft Corp.

Each operating system is given access to a port of adapter 114 or adapter 116. Multiple unique identifiers may be used for one adapter port. One such identifier is called NPIV (i.e. N_Port virtual ID virtualization), used in the Fibre Channel environment. By using NPIV, a single physical port may be given multiple unique identifier values. This allows one physical port to be shared among multiple systems or operating systems, as shown in FIG. 3A. The virtual port identifiers are shown as 304a-304n. In case of iSCSI initiators, a unique iSCSI initiator name may be used by an OS running on a given Virtual Machine.

The operating systems 302a-302n communicate with target 150 via a host interface layer 306. An example, of one such layer is the Hypervisor layer that is provided by VMWare Inc. or the Hyper-V layer provided by Microsoft Corp.

Figure 3B:
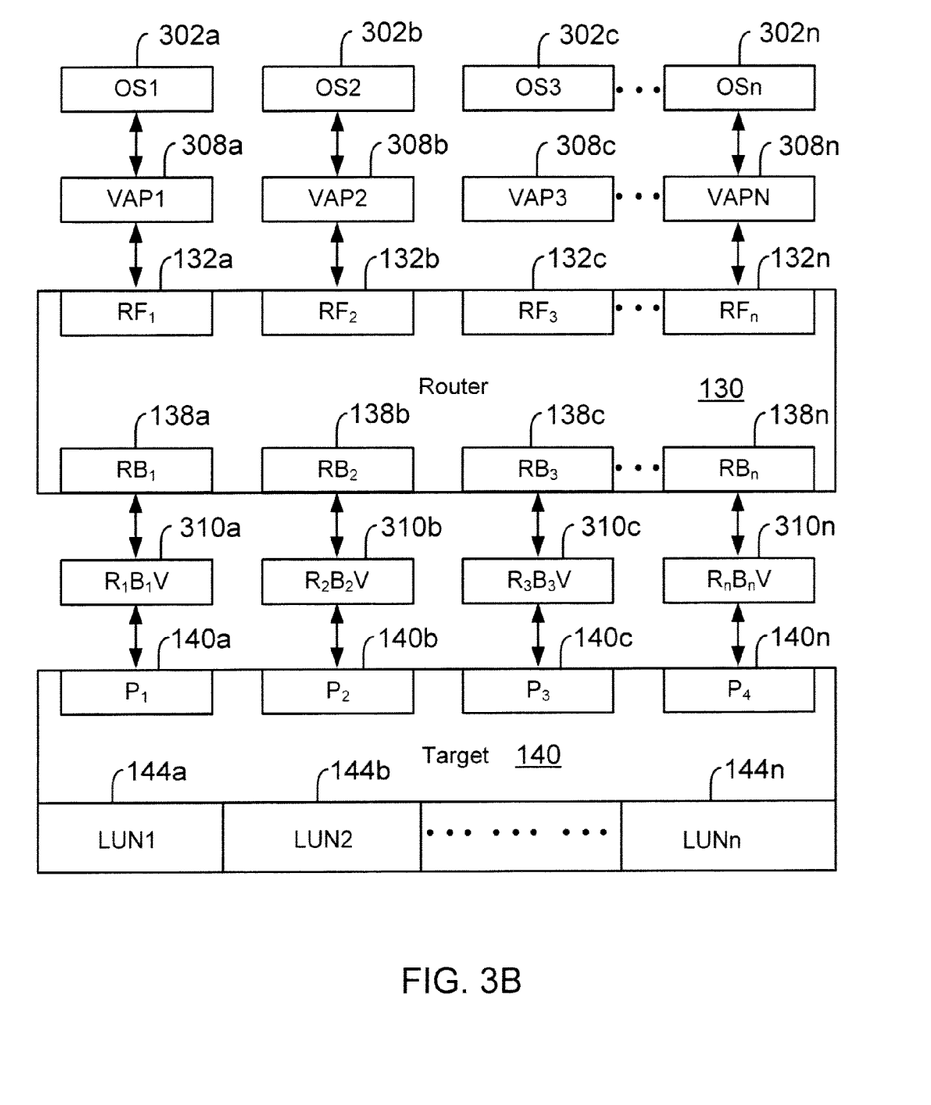
FIG. 3B shows an example of presenting virtual target ports to a host system and virtual hosts to a target, according to one embodiment.

FIG. 3B shows an example of presenting target ports to different operating system images, according to one embodiment. In this example, a target array may be presented to an operating system as multiple target arrays. One way to achieve that is to present a target port as multiple virtual ports. For example, target Port P1 140a is presented as VAP1 308a having multiple virtual ports, as described below. Port2 140b is presented as VAP2 308b, Port 140c is presented as VAP3 308c, Port 140n is presented as VAPN 308n and so forth.

Figure 3C:
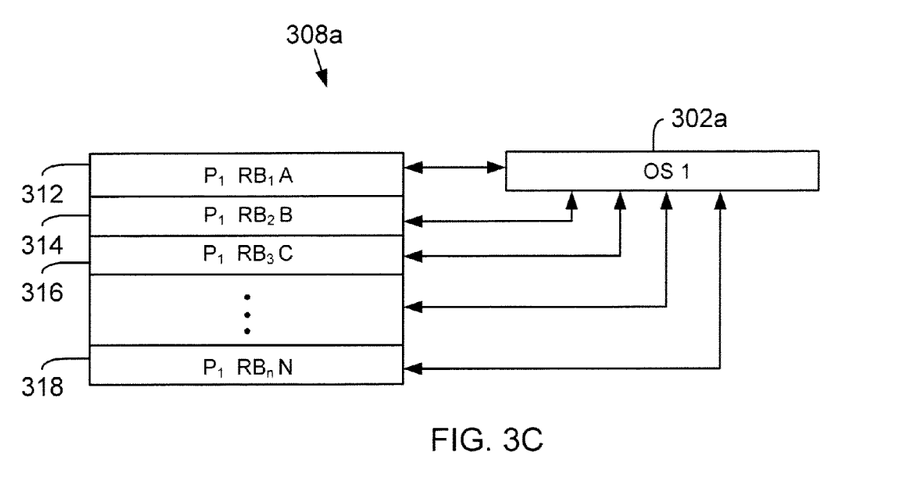
FIG. 3C shows an example of presenting a multiple host system as single host to a target, according to one embodiment.

FIG. 3C shows an example of VAP1 308a, according to one embodiment. VAP1 308a includes a plurality of virtual ports 312, 314, 316 and 318. Virtual port 312 may be identified as P1RB1A, where P1 is port 140a, RB1 is the router backend port 138A and "A" is the unique virtual identifier for P1 140a. Virtual ports 314, 316 and 318 are identified similar to virtual port 312. In one embodiment, if Port 140a is a Fibre Channel port, then NP_IV, may be used to uniquely identify P1 140a as a virtual port for OS 302a.

Referring back to FIG. 3B, router 130 presents an operating system instance as a group to target 150. For example, OS 1 302a may be presented as RB1V 310a via R1B1 138a. OS2 302b may be presented as R2B2V 310b, OS 3 302c may be presented as R3B3V 310c and OSn 302n may be presented as RnBnV 310n.

Figure 3D:
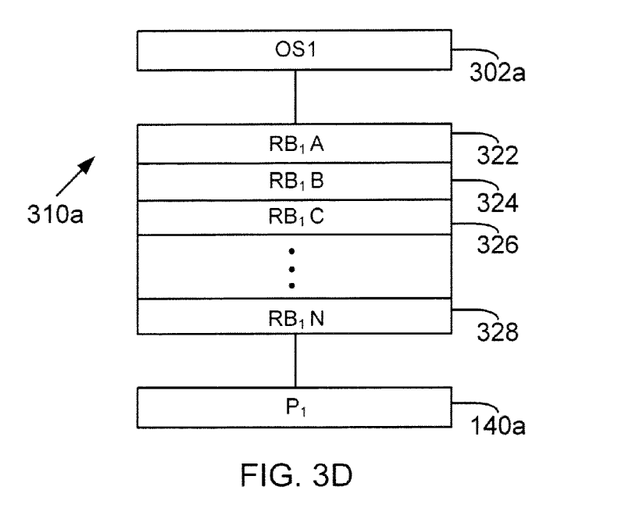
FIG. 3D shows an example of presenting a host as a group.

FIG. 3D shows an example of presenting a host as a group 310A. For example, OS1 302a may be identified as RB1A 322, RB1B 324, RB1C 326 and RB1N 328. To represent OS1 302a as a group, router 130 may virtualize the router back end ports RB1 (138a), RB2 (138b), RB3 (138c) and RBn (138n). In the virtual port identification, RB1 is the backend router port and "A" denotes a unique virtual port identifier associated with RB1. In one embodiment, if RB1 is a Fibre Channel port, then NPIV may be used to identify the virtual ports associated with RB1 138*a*.

When a target port P1 communicates with RB1A 322, it assumes that is communicating with a host system. When it communicates with RB1B 324, it assumes that is communicating with a second host system. This allows target 150 to present more LUNs to the same host system because the target believes that it is interfacing with multiple hosts, while in essence it is communicating with a virtualized back end router port.

Figure 4:
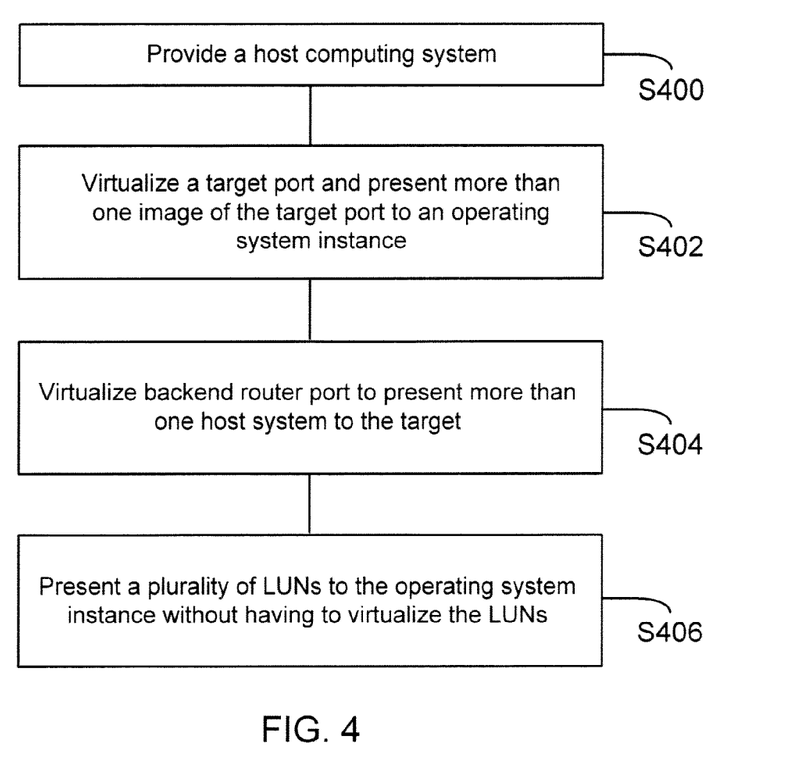
FIG. 4 shows a process flow diagram, according to one embodiment.

FIG. 4 shows a process flow diagram for presenting a target port as a plurality of virtual ports to a host computing system so that multiple operating system images are able to access storage LUNs for a storage array, without having to virtualize the LUNs, according to one embodiment. The process begins in block S400 where a host computing system 101 is provided. In block S402, a target port, for example, P1 140*a* is virtualized and presented to an operating system instance, for example, 302*a*. In block S404, the router 130 presents a host system as a group to the target. For example, the host system may present OS1 302*a* as R1B1V 310*a* (FIG. 3B). Thereafter, in block S406 a plurality of LUNs is presented to the operating system instance without having to virtualize the LUNs.

In one embodiment, because each target port is presented as multiple virtual ports, it allows the operating system to view more LUNs than if only one target port was available for the operating system instance. For example, in system 100, a target port may be limited to present only a certain number of LUNs, for example, 256 LUNs. By presenting the virtual ports, one may be able to increase the number of LUNs that are presented to the host. As an example, if the target port is presented as 4 virtual ports, then each virtual port can present 256 LUNs. This is a fourfold increase in the number of LUNs that can be presented without virtualizing the LUNs.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method, comprising:
    configuring a target port of a target storage array as a plurality of virtual ports to access storage space at the storage array;
    presenting the plurality of virtual ports to an operating system instance executed by a computing system processor; and
    a device coupled to the target storage array and the computing system presenting the plurality of virtual ports to the operating system instance in a virtual machine environment;
    wherein the device presents the operating system instance as a plurality of host systems to the target port by virtualizing a device port coupled to the target port such that it appears to the target storage array that it is communicating with the plurality of host systems when presenting a plurality of logical unit numbers (LUNs) via the plurality of virtual ports.

2. The method of claim 1, wherein a plurality of operating system instances are executed by the computing system and each operating system instance is presented with a plurality of the virtual ports associated with the target port of the target storage array.

3. The method of claim 2, wherein each operating system instance is presented as multiple instances by virtualizing a back-end port of a device coupled to the target storage array and the computing system.

4. The method of claim 1, wherein the device is a router having a plurality of ports.

5. The method of claim 1, wherein the device port is configured to operate as a Fibre Channel port.

6. The method of claim 1, wherein the device port is configured to use Internet over Small Computer system interface (iSCSI) protocol for communication.

7. A system, comprising:
    a computing system having a processor for executing an operating system instance in a virtual environment; and
    a device operationally coupled to the computing system and a target storage array having a plurality of target ports interfacing with a plurality of device ports of the device;
    wherein the device presents a target port as a plurality of virtual target ports to the operating system instance for accessing the storage array where each virtual target port is used to present a plurality of logical unit numbers (LUNs) associated with storage space at the target storage array, without having to virtualize the LUNs for the operating system instance; and
    wherein the device presents a device port to the target storage array as a plurality of virtual device ports such that the target port is presented with more than one image of the computing system so that it appears to the target port that it is communicating with more than one computing system when presenting the plurality of LUNs via the plurality of virtual target ports.

8. The system of claim 7, wherein the processor executes a plurality of operating system instances and the device presents the target port as a plurality of virtual target ports to each operating system instance.

9. The system of claim 8, wherein each operating system instance is presented to the target port by the device as multiple operating system instances by virtualizing one of the ports of the device.

10. The system of claim 7, wherein the device is a router having a plurality of ports.

11. The system of claim 7, wherein the device port is configured to operate as a Fibre Channel port.

12. The system of claim 7, wherein the device port is configured to use Internet over Small Computer system interface (iSCSI) protocol for communication.

13. A device, comprising:
    a plurality of front-end ports operationally coupled to a computing system having a processor for executing a plurality of virtual machines;
    a plurality of back-end ports coupled to a target storage array having a plurality of target ports used for reading and writing information to a storage device; and
    a processor executing instructions out of a device memory for presenting a target port as a plurality of virtual ports to a virtual machine for accessing the storage device; and presenting one of the back end device ports to one of the target ports as a plurality of virtual machine ports such that the target port is presented with more than one image of the virtual machine and so that it appears to the target port that it is communicating with more than one virtual machine;

wherein a plurality of operating system instances are executed by the computing system and each operating system instance is presented with a plurality of the virtual target ports associated with one of the target ports of the target storage array;

wherein each virtual port is used to present a plurality of logical unit numbers (LUNs) associated with storage space at the target storage array, without having to virtualize the LUNs for the operating system instance; and wherein the device presents the device port to the target storage array as a plurality of virtual machine ports such that the target port is presented with more than one image of the computing system making the target port believe it is communicating with more than one computing system when presenting the plurality of LUNs via the plurality of virtual ports.

14. The device of claim 13, wherein each operating system instance is presented as multiple instances to the target port by virtualizing one of the back-end ports of the device.

15. The device of claim 13, wherein the device is a router having a plurality of ports.

16. The device of claim 13, wherein the device port is configured to operate as a Fibre Channel port.

17. The device of claim 13, wherein the device port is configured to use Internet over Small Computer system interface (iSCSI) protocol for communication.

* * * * *